United States Patent [19]

Stringer

[11] Patent Number: 5,794,470
[45] Date of Patent: Aug. 18, 1998

[54] MECHANICAL SEAT LOCK

[75] Inventor: Calvin R. Stringer, Saugus, Calif.

[73] Assignee: P.L. Porter Co., Woodland Hills, Calif.

[21] Appl. No.: 666,878

[22] Filed: Jun. 25, 1996

[51] Int. Cl.⁶ .................................................. A47C 31/00
[52] U.S. Cl. .................... 70/261; 297/375; 188/67
[58] Field of Search .................. 70/181, 189, 261;
188/67, 77 W; 74/531; 297/374, 375; 192/81 R,
81 C; 292/60, 175, 275; 248/354.1, 410,
414

[56] References Cited

U.S. PATENT DOCUMENTS

| | | |
|---|---|---|
| 2,750,994 | 6/1956 | Howell, Jr. . |
| 3,249,180 | 5/1966 | Torossian ........................... 188/67 |
| 3,284,841 | 11/1966 | Patriquin ........................ 292/275 X |
| 3,874,480 | 4/1975 | Porter et al. ....................... 188/67 |
| 4,099,602 | 7/1978 | Kourbetsos ...................... 188/300 |
| 4,411,339 | 10/1983 | Porter ................................ 188/67 |
| 4,425,987 | 1/1984 | Porter ................................ 188/67 |
| 4,457,406 | 7/1984 | Porter ................................ 188/67 |
| 4,577,730 | 3/1986 | Porter ................................ 188/67 |
| 4,685,734 | 8/1987 | Brandoli ....................... 297/375 X |
| 4,691,890 | 9/1987 | Han ............................. 298/375 X |
| 4,711,326 | 12/1987 | Baugh et al. ...................... 188/67 |
| 4,966,045 | 10/1990 | Harney .......................... 188/67 X |
| 5,133,245 | 7/1992 | Lee et al. ........................ 92/13.4 |
| 5,150,771 | 9/1992 | Porter ................................ 188/67 |
| 5,157,826 | 10/1992 | Porter et al. ................... 292/60 X |
| 5,211,379 | 5/1993 | Porter ............................. 267/221 |
| 5,219,045 | 6/1993 | Porter et al. ...................... 188/67 |
| 5,335,756 | 8/1994 | Penisson .......................... 188/67 |
| 5,429,217 | 7/1995 | Stringer et al. ................. 188/300 |
| 5,441,129 | 8/1995 | Porter et al. ...................... 188/67 |

FOREIGN PATENT DOCUMENTS 1477908  3/1967  France .

Primary Examiner—Suzanne Dino Barrett
Attorney, Agent, or Firm—Oppenheimer Wolf & Donnelly LLP

[57] ABSTRACT

The mechanical lock has an elongated housing. A pair of end bushings mounts in the housing, and a rod translates through the end bushings and at least partially through the housing. A pair of coiled locking springs within the housing are around the rod and between the end bushings. One end of each locking spring is fixed within the housing, and the other end of each locking spring is free. The normal inside diameter of each locking spring is less than the outside diameter of the rod so that the locking springs secure the rod. A handle can uncoil the free end of each locking spring to increase their inside diameter and release the rod. A wedge bushing mounts in the housing between the locking springs. The face on each end bushing against its respective locking spring is at an angle, and the wedge bushing also has an angled face on the other side of each spring. Therefore, when the rod and housing are loaded with respect to each other, the angled face of one bushing cants one locking spring, and an angled face of the wedge bushing cants the other locking spring.

8 Claims, 4 Drawing Sheets

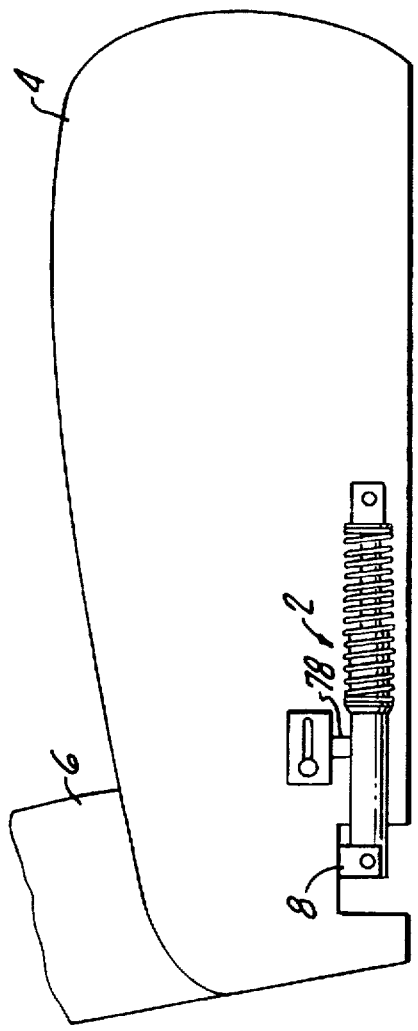
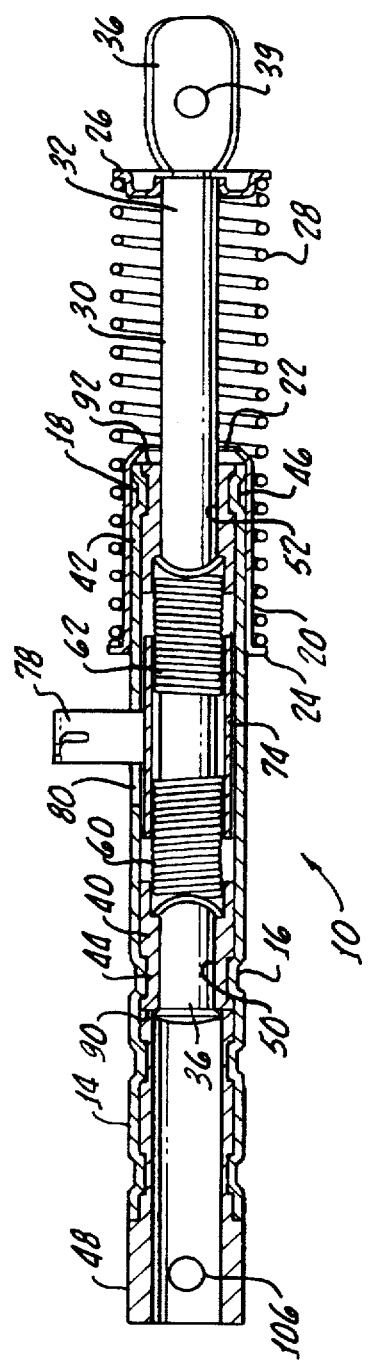
Fig. 1.
Fig. 2.

MECHANICAL SEAT LOCK

BACKGROUND OF THE INVENTION

1. Field of the Invention

The present invention relates to locks primarily for vehicle seats. It is the type of lock in which a rod translates axially within a housing. Coil springs normally grip the rod until the springs are uncoiled slightly, which releases the rod.

2. State of the Art

Mechanical locks allow parts to move relative to each other and to lock them together when necessary. Adjustable vehicle seats commonly use this type of lock for controlling seat elevation and tilt angle. They also lock the seat on horizontal rails to position the seat from a steering wheel or an accelerator or brake pedal. Porter and Sember, U.S. Pat. No. 3,874,480 (1975), "Friction Brake Mechanism," Porter, U.S. Pat. No. 4,577,730 (1986), "Mechanical Lock," and Porter and Babiciuc, U.S. Pat. No. 5,219,045 (1993), "Linear Mechanical Lock with One-Piece Lock Housing," are three examples of such locks. Applicant's earlier filed application, Ser. No. 08/506,085, filed Jul. 24, 1995, entitled, "Dual Locking Linear Mechanical Lock for High Loads," is another example of a mechanical lock.

These locks rely on a rod that can move longitudinally within an elongated, tubular housing. The housing or rod attaches to a fixed vehicle part, and the other attaches to a part that can move. A coil spring is fixed relative to the housing and extends around the rod. The spring's normal inside diameter is slightly less than the rod's outside diameter. A release lever acting on the coil spring's free end unwinds or uncoils the spring slightly, which increases the spring's inside diameter enough to release the rod.

Because the rod or housing is subject to bi-directional loading, most of these locks use two springs, one on each side of a common release lever. One spring handles most of the load in each direction. Two end bushings contain the spring axially. One end tang of each spring is fixed to its bushing, and a tang at the other end of each spring connects to a release lever. Lever movement simultaneously unwinds both springs to release the rod.

An axial bore through each bushing supports the rod and permits it to slide through the lock housing. The bushing also may have an angled bearing surface adjacent the locking spring. Porter, U.S. Pat. No. 4,456,406 (1984), "Improved Friction Lock," is an example of a lock having such a bushing. When the rod is loaded axially, the rod pulls one coil spring against the bushing's angled surface. This action cants the end coils of the spring, which deforms the coils, thus increasing the coil's friction force on the rod.

The locks described in the patent are very useful, but they are limited to axial loads of about 1,350–1,800 kg. A higher load either destroys the springs, or they apply insufficient force to stop rod movement. The lock described in application Ser. No. 08/506,085 can resist about a 9,000 kg load, but at such higher loads, parts of the lock permanently deform. Thus, after being subjected to such high loads, the lock must be repaired or replaced.

Products other than coil spring mechanical locks, such as electric ball screw actuators and spinning nut mechanical systems, also are available. The spinning nut is on an Acme threaded rod, which has a high helix thread. Load on the rod causes the nut to rotate, but a latch system on the nut stops the rotation. Alternatively, the Acme screw rotates while the nut is held stationary. These systems are expensive and usually heavier than coil spring-based locks. Weight is a major issue for seats in airplanes, and automobile manufacturers also look to decrease weight. However, one must not sacrifice load carrying abilities merely to decrease the weight.

Although the coil spring mechanical lock has proved quite satisfactory, having the lock resist greater loads is always desirable. It also is desirable if the lock can resist higher forces without having parts deform as they do in the invention described in Ser. No. 08/506,085. One can build stronger locks that are bulkier or weigh more. That would counter the goals of overall weight reduction in vehicles. Further, the lock must be confined to fixed locations in a vehicle, and a bulky lock may not fit in a convenient or necessary location.

Applicant believes that one reason coil spring mechanical locks have been limited to 1800 kg loads is that one spring bears most of the load in one direction while the other spring contributes little load resistance in that direction. The spring that was not active when load was in the first direction becomes the more active spring when the lock is loaded in the opposite direction. That is because in existing designs, only one springs cants, and canting causes the spring to exert substantially greater force on the rod.

SUMMARY OF THE INVENTION

The principal objects of the present invention are to disclose and provide a mechanical lock that can withstand loads greater than 1,800 kg (4,000 lbs.) (conversions are approximate), up to about 6,200 kg. Another object is to disclose and provide such a lock that is relatively inexpensive and light weight.

In order to accomplish this goal, the mechanical lock of the present invention cants both springs. Accordingly, when the device loads in one direction, both springs cant, and they cant in the opposite direction when the device is loaded in the opposite direction. In the present invention, one spring cants against an angled surface of one end bushing. The other spring cants against an intermediate wedge bushing. The wedge bushing has angled faces and is between the springs. Therefore, when the device is loaded in one direction, one spring cants because of its interaction with an end bushing, and the other spring cants because of its interaction with the wedge bushing. When the device is loaded in the opposite direction, the spring that had canted against the wedge bushing now cants against its end bushing, and the spring that had canted against its end bushing now cants against the wedge bushing.

The wedge bushing may be attached to the handle mechanism. It is that mechanism that pushes on end tangs of each spring to uncoil the spring and release the rod.

These and other objects of the invention may be seen more clearly from the detailed description of the preferred embodiment that follows.

BRIEF DESCRIPTION OF THE DRAWINGS

FIG. 1 is a side elevation of a vehicle seat with a mechanical lock mounted for adjusting the seat back.

FIG. 2 is a side, sectional view of the mechanical lock of the present invention.

DETAILED DESCRIPTION OF THE PREFERRED EMBODIMENTS

Figure 3:
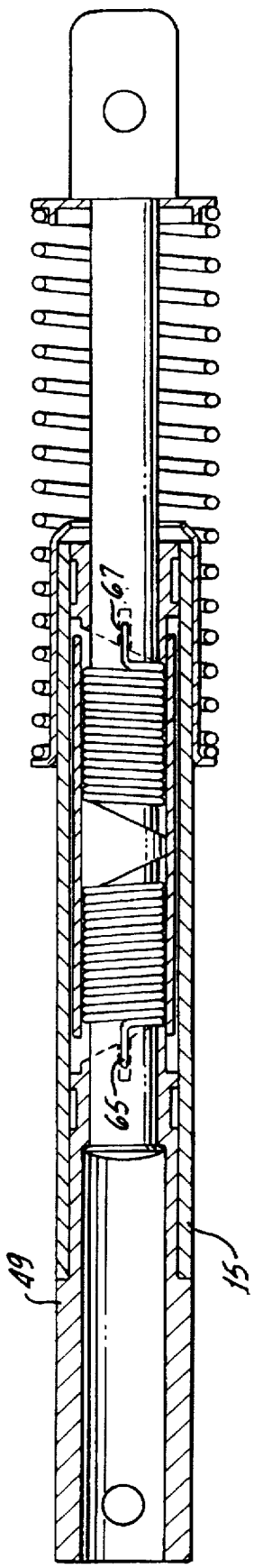
FIG. 3 is another sectional view showing details of a modified embodiment of the mechanical lock of the present invention.

FIG. 1 shows the environment in which a mechanical lock 2 is used. In FIG. 1, the lock is mounted near the base of a vehicle seat 4. The lock may control many positions of a vehicle seat, but FIG. 1 shows it locking the seat back 6 through a connection 8 from the seat back. When the mechanical lock is in its locked condition, the seat back cannot pivot, but when the mechanical lock is unlocked, the driver or passenger can pivot the seat back.

The housing 7 of mechanical lock 2 in FIG. 1 is shown attached to the seat back through connection 8. The rod 9, which moves within the housing is fixed to the seat. Accordingly, when one pivots the seat back 6, the housing moves while the rod stays stationary. Alternatively, the housing 7 can be fixed, and the rod 9 attached ti connection 8. In that embodiment, the housing remains stationary, and the rod moves. This latter arrangement is preferred and normal.

Figure 4:
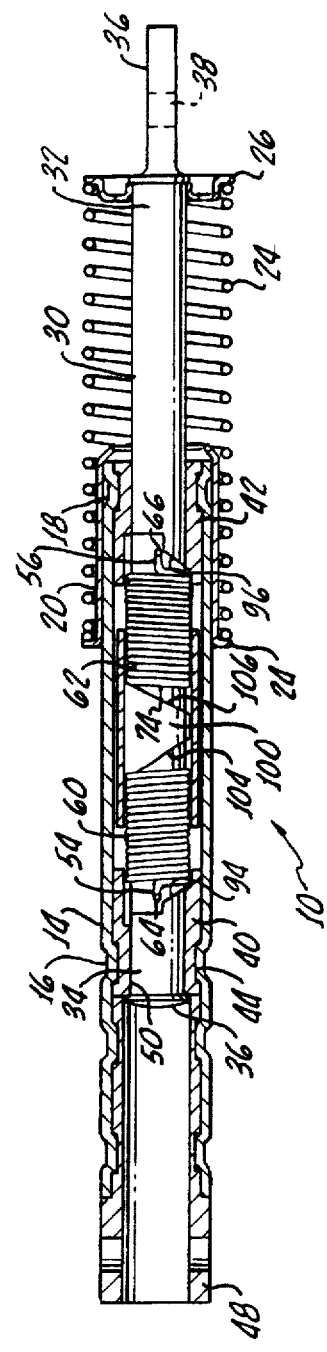
FIG. 4 is a plan sectional view of the FIG. 2 mechanical lock of the present invention.

The mechanical lock 10 of the present invention comprises a housing 14 (FIGS. 2 and 4). The housing 15 in FIG. 3 is of a slightly different configuration and will be described later. The FIGS. 2 and 4 housing is formed of steel tubing. In the exemplary embodiment, its OD is 25.4 mm, and the ID is 21.18 mm. Thus, the material thickness is about 1.5 mm. The length of the housing and the other dimensions will vary with the application. The housing length in the exemplary embodiment is about 298 mm.

The mechanical lock of the present invention also includes a rod. In the exemplary embodiment, rod 30 (FIGS. 2 and 4-6) has a first end 32 extending into the housing and a second end 34 extending out of the housing. The rod in the FIG. 2 exemplary embodiment is 358 mm long and formed of AISI 1045 steel. It has a 12.7 mm OD. The surface is centerless ground to a 48-60 AA finish. The rod also may be hollow as FIGS. 5 and 6 show.

The rod's first end 32 is flattened into a flange 36. The flange has a hole 38 for fastening the rod to a vehicle part such a bracket 8 (FIG. 1). Instead of a flange, the rod's end could be threaded to accept a fitting in the shape of a flange or a compatible shape. That fitting would have means for connecting the rod to part of the vehicle.

Figure 5:
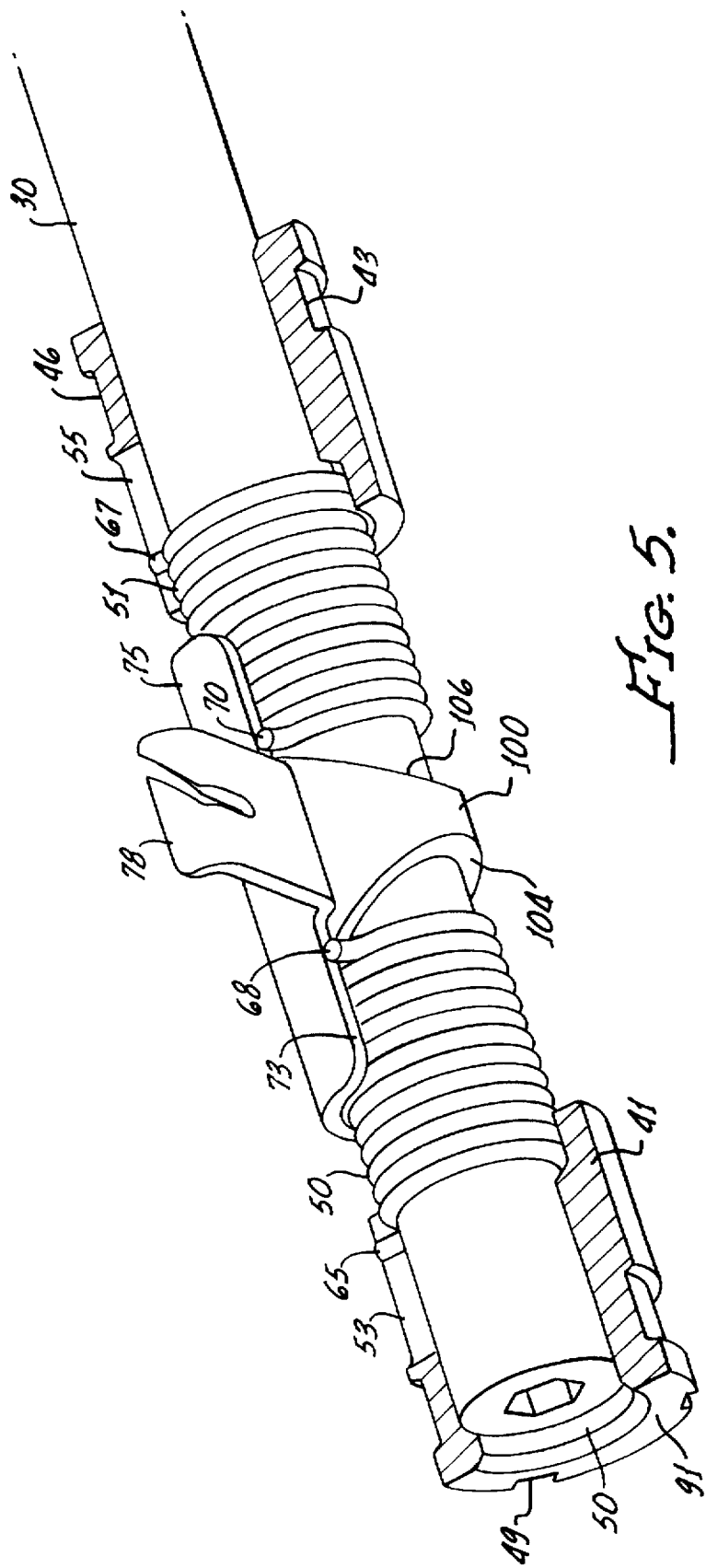
FIG. 5 is a perspective, partially cut away view of the mechanical lock of the present invention.
Figure 6:
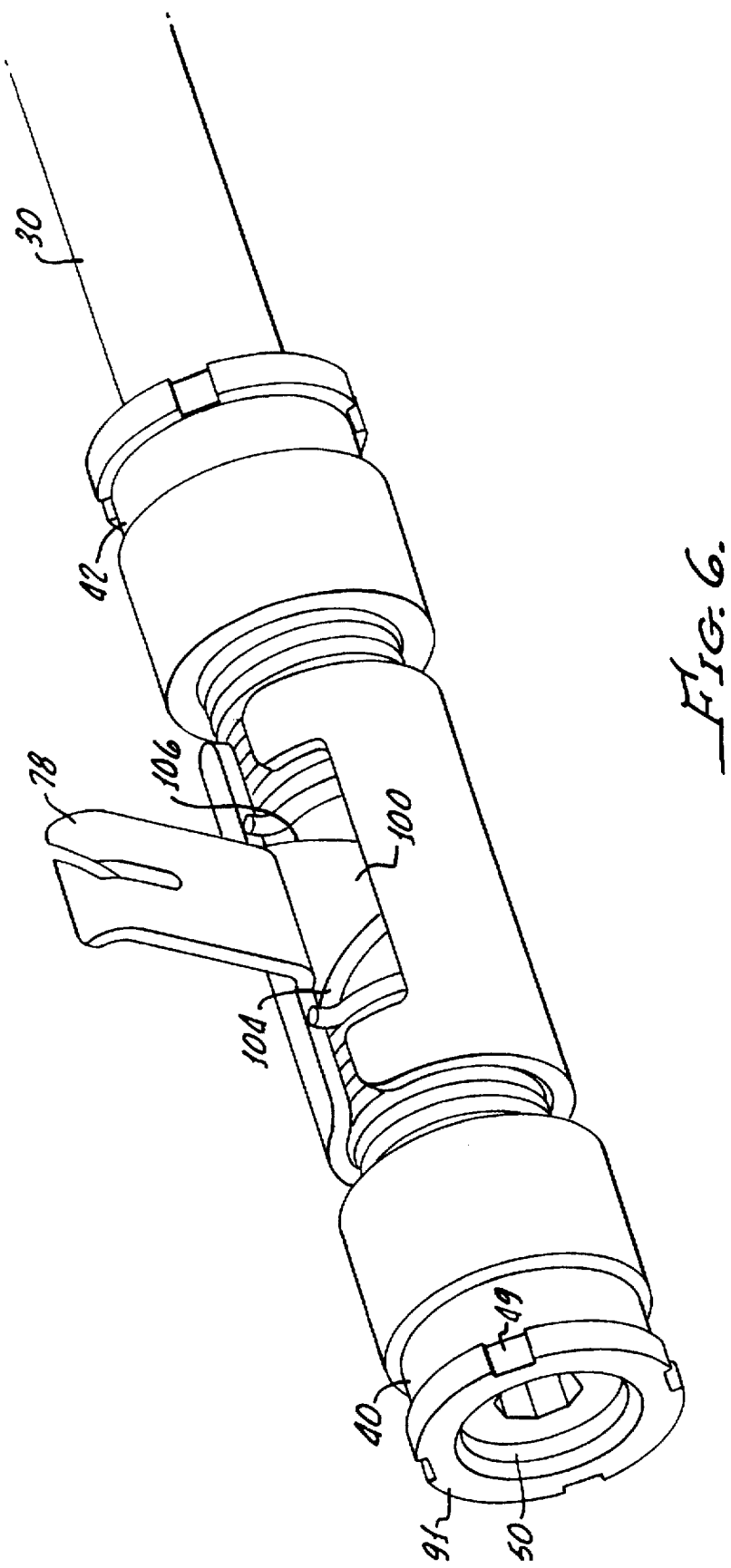
FIG. 6 is another partially cut away perspective view of the present invention's mechanical lock.

The housing receives a pair of end bushings 40 and 42 (FIGS. 2 and 4-6). In the exemplary embodiment, the bushings have a 21.08 mm OD and a 16.14 mm ID and are 22.86 mm long. Each bushing has a circumferential groove 44 and 46. These grooves receive dimples 16 and 18 in the housing 14, which secure the bushings in place. The grooves 44 and 46 may be knurled or have another roughened or notched surface to prevent the bushings from rotating. Also, grooves 44 and 46 may be continuous or interrupted. Likewise, the housing may have multiple dimples 16 and 18, one or more continuous grooves or spaced ball swages. A sleeve, such as sleeve 48 (FIGS. 2 and 4) or 45 (FIG. 3) may secure a bushing within the housing. The sleeve may have teeth (not shown) for attaching to bushing notch 49 (FIGS. 5 and 6). Welding, fasteners, adhesives or other methods also may be possible depending on the materials and the environment.

Each bushings 40 and 42 has central axially aligned bores 50 and 52 through which rod 40 passes (FIGS. 2 and 4-6). The ID diameter of each bore is slightly greater than the rod's OD. The bores' 16.14 mm ID receives the rod's 12.70 mm ID. The rod also may have a widened end 36 (FIGS. 2 and 4) with a diameter greater than the bushing bores' ID. This prevents the rod from being pulled to the right (FIGS. 2 and 4) out of the housing.

The mechanical lock of the present invention also includes a pair of wound locking springs. In the FIGS. 2 and 4 exemplary embodiment, each locking spring 60 and 62 is wound from 1.575 mm music wire into 16¾ coils. The number of coils will vary depending on the size of the housing. For example, the springs 61 and 63 in FIGS. 5 and 6 each have 12¾ coils. When not assembled, the coil's ID is 12.34 mm; the assembled ID is 12.70 mm, which is the OD of rod 20. Therefore, when the locking springs are around the rod, each spring grips the rod tightly. If a new embodiment uses a different rod OD, the springs' dimension also will change. The springs are heat treated at about 525°±25° for 15 to 25 minutes. They may be oiled with CRC-36 or an equivalent.

Each locking spring has an end fixed in the housing. The fixed end in the exemplary embodiment is a first end tang 64 and 66. Each tang seats in a corresponding notch 54 and 56 in bushings 40 and 42. (FIG. 4). In that embodiment, each first end tang 64 and 66 extends longitudinally. In FIG. 5, the end tangs 65 and 67 extend radially outward where they engage notches 53 and 55, respectively.

Each spring has a second end tang 68 and 70 (FIGS. 5 and 6). Each tang is spaced from the first end tangs 65 and 67. The second end tangs fit in groove 73 in handle fitting 75 (FIGS. 5 and 6). See also handle fitting 74 in FIGS. 2 and 4. The handle fitting is a tubular ring around parts of the locking springs. The ring is not closed, and a gap in the ring forms groove 73. Handle 78 (FIGS. 5 and 6) is bent outward from the handle fitting. The handle extends through an opening 80 in housing 14 (See FIG. 2).

Each bushing 40 and 42 has an outer face 90 and 92 that is perpendicular to the longitudinal axis of the rod and housing (FIGS. 2 and 4). See also outer face 91 in FIGS. 5 and 6. The bushings' inner faces 94 and 96, however, are angled at about 60° to that axis. Angles ranging from 55° to 65° are acceptable, and a greater range is possible. Note that the springs 50 and 52 have a natural helical angle, which in FIGS. 2-4 appear to be at a small acute angle to the rod's longitudinal axis. The 60° angle of the bushings' inner faces 94 and 98 is a substantially greater acute angle than the natural helical angle of the springs' coils. Thus, when this application says that a bushing's face is angled to the rod's longitudinal axis, it means that the angle is substantially greater than the natural helical angle of the locking spring's coils. Coil locking springs 50 and 52 interact with the angled bushing faces in a manner discussed below. See also the previously mentioned U.S. Pat. Nos. 3,874,480 4,456,406 and 5,219,045 and application Ser. No. 081506,085, which describe the cooperation between a coil spring and an angled surface of a bushing. Their descriptions are incorporated by reference.

The coil locking springs 50 and 52 normally are not uncoiled so they grip rod 30. If one applies a relatively small axial load to the rod—for example, a load transmitted from a car seat during a sudden stop—locking springs 50 and 52 supply sufficient force on the rod to continue gripping the rod. The rod, therefore, does not move longitudinally. As the load between the rod and the housing increases, one of the locking springs 50 or 52 pushes against the face 94 or 96 of its bushing 40 or 42 with increased force. The angle of bushing faces 94 or 96 caused the coil on one spring to cant with respect to the rod. Accordingly, the normally circular coils become ellipsoids. This increases the force that the coil applies to the rod so the coil spring grips the rod more tightly. Thus, canting increase the load-resisting capabilities of the present invention's mechanical lock. When the load from the rod is released, the coil spring returns to its circular shape.

When a high load acts on the rod in conventional mechanical locks, one locking spring cants against a bushing to provide additional load resistance. The other locking spring does not cant, however. Therefore, it applies much less load resistance than the canted spring.

To use the canted load resistance of both springs simultaneously, the present invention has a wedge bushing between the springs. In the exemplary embodiment of FIG. 4, wedge bushing 100 mounts between the two coil locking springs 60 and 62. See also FIGS. 5 and 6. The wedge bushing seats inside of handle fitting 74 (FIGS. 2 and 4) or 75 (FIGS. 5 and 6). Though there are many ways to attach the wedge bushing and handle bushing together, the exemplary embodiment uses a dimple (not shown) on the handle bushing that extends into a hole on the wedge bushing.

The wedge bushing has two angled faces 104 and 106 (FIGS. 2, 5 and 6). The wedge bushing faces are parallel to the end bushing's face 94 or 96 that faces the wedge bushing's face. See FIG. 2. When a load is applied on the rod 30 relative to the housing 14, for example, pulling the rod to the right relative to the housing, the rod begins moving toward the right. Coil locking spring 62 resists that movement. A sufficient force draws the spring into angled face 96 of the right end bushing 42. Therefore, the spring cants to apply more force on the rod. At the same time, the other coil locking spring 60 also moves to the right. It then contacts angled face 104 of wedge bushing 100. Accordingly, spring 60 also cants to apply additional force on the rod. Because faces 94 and 96 are angled with respect to each other, and faces 104 and 106 are angled to each other, springs 60 and 62 cant at angles to each other.

In one test using springs having 16¾ turns, rod deflection relative to the housing at 13,500 lbs. (6,140 kg) load was about 0.4" (10 mm). Failure occurred at a 13,620 lb. (6,190 kg) load. Deflection just before failure was about 0.43" (10.5 mm). These results greatly surpass the maximum 1,800 kg prior art load capability.

Turning to some of the other features of the present invention's mechanical lock, housing 14 has a front sleeve 20. (FIGS. 2 and 4). The front sleeve is press fit or welded to the housing, or it may have a dimple received within a corresponding groove in the housing. The sleeve extends forward slightly over the housing's front end 22. The sleeve also has a radial ring 24. Similarly, a ring 26 attaches to first end 32 of rod 30. Tabs or other projections, which do not extend continuously around the housing or attachment fitting, may replace either ring.

Rings 24 and 26 form opposing ledges. A helical bias spring 28 (FIGS. 2 and 4) in compression extends between the rings and urges rod 30 outward (i.e., to the right relative to the housing in FIGS. 2 and 4). The length, diameter, spring constant and other spring properties will vary with the application.

When one wants to unlock the present invention's mechanical lock, he or she activates handle 78 directly or indirectly. Pushing or pulling on a part of the handle within a user's reach activates the handle directly. Indirect activation uses a remote activator. In an example of the direct mode, part of the handle projects from the side of an automobile seat within reach of a driver's or passenger's seat. See FIG. 1. Also, see previously-mentioned U.S. Pat. No. 4,456,406, which shows a handle that may extend outside a seat.

When a user activates handle 78, the handle moves between the FIG. 6 and FIG. 5 positions. This movement causes the wall of groove 73 in handle fitting 75 to move spring tangs 68 and 70 clockwise (looking axially from the left in FIGS. 5 and 6). The other end of each coil locking spring is fixed. Therefore, the action on the spring tangs cause springs 60 and 62 to unwind or uncoil slightly. The uncoiling action increases each spring's inside diameter enough to release rod 30. The rod, therefore, can translate into and out of the housing's open end 22. When the user releases the handle, spring force from the coiled locking springs or an auxiliary spring, returns the handle to its normal position. Therefore, the coil springs grip the rod.

It also is possible—though probably not desirable—to fix the end tangs of the springs to a fixed fitting between the springs and attach the other end tangs to end bushings that could rotate. The handle then would attach to the end bushings to rotate them. Accordingly, when the end bushings rotate, they would act on free end tangs of the springs to uncoil them.

There are several alternatives for attaching the housing to the vehicle. A bolt (not shown) can extend through a hole 106 (FIG. 2) in sleeve 48. A bolt can allow rotation about the axis of hole 106 to allow pivoting of the housing. The pivoting may be necessary depending on the geometry of the part that the mechanical lock of the present invention locks. Sleeve 48 or housing 14 also may mount a ball hitch, similar to the ball used to mount trailers to a car or truck. That type of mount may be desirable for different vehicle part geometries. Previously-mentioned Ser. No. 08/506,085 discloses another way of attaching the housing to a vehicle.

Numerous modifications and alternate embodiments will occur to those skilled in the art. Therefore, applicant intends that the invention be limited only in terms of the appended claims.

I claim:

1. A mechanical seat lock comprising:

a housing a rod having a first end extending into the housing and a second end extending out of the housing, the rod having a longitudinal axis;

a pair of coiled locking springs, each locking spring having a first portion fixed in the housing and extending around a portion of the rod, the normal inside diameter of each locking spring being less than the outside diameter of the rod so that each locking spring normally grips the rod, the coils of each locking spring having a natural helical angle with respect to the longitudinal axis of the rod;

a movable handle engaging a second portion of each locking spring, the second portion having freedom of movement and upon movement of the moveable handle uncoiling the locking spring to increase the locking spring's inside diameter to be greater than the outside diameter of the rod to release the rod;

a pair of end bushings in the housing, each end bushing being acted on by one of the locking springs, each end bushing having a face against the locking spring, against which the end bushing acts, the face being angled at an acute angle to the rod's longitudinal axis at an angle substantially greater than the natural helical angle of the coiled locking springs; and a wedge bushing in the housing between the locking springs, the wedge bushing having opposing faces, each face being against one of the locking springs, each face of the wedge bushing being angled at an acute angle to the rod's longitudinal axis at an angle substantially greater than the natural helical angle of the coiled locking springs.

2. The mechanical lock of claim 1 wherein the angled face of the end bushing on one side of one locking spring is parallel to the angled face of the wedge bushing on the other side of the one locking spring.

3. The mechanical lock of claim 1 wherein the handle extends outward from a handle fitting, the handle fitting being mounted in the housing around the rod, the handle fitting having a groove, and an end tang on each locking spring extending into the groove.

4. The mechanical lock of claim 1 wherein the handle extends outward from a handle fitting, the handle fitting being mounted in the housing around the rod, the wedge bushing being mounted within and fixed to the handle fitting.

5. A mechanical lock comprising: an elongated housing; a pair of end bushings in the housing; a rod extending through the end bushings and at least partially through the housing, the rod having a longitudinal axis; a pair of coiled locking springs within the housing, around the rod and between the end bushings; one end of each locking spring being fixed within the housing and the other end of each locking spring being free, the normal inside diameter of each locking spring being less than the outside diameter of the rod to secure the rod; a handle moveable with respect to the housing and engaging the free end of each locking spring to move the free end of the locking spring in a direction uncoiling the locking spring to increase the inside diameter of the locking spring and release the rod; a wedge bushing in the housing between the locking springs; and end bushing canting means on each end bushing and wedge bushing canting means on the wedge bushing for canting both locking springs when loads are applied between the rod and the housing, the end bushing canting means and the wedge bushing canting means each being-ancited at an acute angle to the rod's longitudinal axis at an angle substantially greater than the natural helical angle of the coiled locking springs.

6. The mechanical lock of claim 5 wherein the canting means comprises a face on each end bushing against the locking spring against which the end bushing acts and angled at an acute angle to the rod's longitudinal axis and opposing faces on the wedge bushing and angled at an acute angle to the rod's longitudinal axis, each angled face of the wedge bushing being against one of the locking springs.

7. The mechanical lock of claim 6 wherein the angled face of the end bushing on one side of one locking spring is parallel to the angled face of the wedge bushing on the other side of the one locking spring.

8. A mechanical lock comprising: an elongated housing; a pair of end bushings in the housing; a rod extending through the end bushings and at least partially through the housing, the rod having a longitudinal axis; a pair of coiled locking springs within the housing, around the rod and between the end bushings; one end of each locking spring being fixed within the housing and the other end of each locking spring being free, the normal inside diameter of the rod to secure the rod; a handle moveable with respect to the housing and engaging the free end of each locking spring to move the free end of the locking spring in a direction uncoiling the locking spring to increase the inside diameter of the locking spring and release the rod; a wedge bushing in the housing between the locking springs; each end bushing having a face and the wedge bushing having two opposing faces, the face of each end busing and the faces of the wedge bushing each being angled at an acute angle to the rod's longitudinal axis at an angel substantially greater than the natural helical angle of the locking springs, whereby the face of one end bushing on one side of a locking spring and the face of the wedge bushing on the other side of the locking spring both canting the locking spring when loads are applied between the rod and the housing.

\* \* \* \* \*

UNITED STATES PATENT AND TRADEMARK OFFICE
CERTIFICATE OF CORRECTION

PATENT NO.    : 5,794,470
DATED         : August 18, 1998
INVENTOR(S)   : Calvin R. Stringer It is certified that error appears in the above-identified patent and that said Letters Patent is hereby corrected as shown below:

<u>Column 8,</u>
Line 1, replace "being-ancited" with -- being angled --.
Line 22, after "the normal inside diameter" insert -- of each locking spring being less than the outside diameter --
Line 30, replace "busing" with -- bushing --.
Line 32, replace "angel" with -- angle --.

Signed and Sealed this

Eighteenth Day of March, 2003

JAMES E. ROGAN
*Director of the United States Patent and Trademark Office*